(12) United States Patent
Jung et al.

(10) Patent No.: US 11,736,655 B2
(45) Date of Patent: *Aug. 22, 2023

(54) TERMINAL HAVING CAMERA AND METHOD OF PROCESSING IMAGES AT DIFFERENT FOCAL LENGTHS BY SINGLE IMAGE CAPTURE REQUEST

(71) Applicant: Samsung Electronics Co., Ltd., Suwon-si (KR)

(72) Inventors: Han Chul Jung, Suwon-si (KR); Sun Ae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

This patent is subject to a terminal disclaimer.

(21) Appl. No.: 17/241,598

(22) Filed: Apr. 27, 2021

(65) Prior Publication Data

US 2021/0250521 A1 Aug. 12, 2021

Related U.S. Application Data

(63) Continuation of application No. 16/259,392, filed on Jan. 28, 2019, now Pat. No. 10,999,529, which is a continuation of application No. 13/908,494, filed on Jun. 3, 2013, now Pat. No. 10,225,488, which is a continuation of application No. 12/634,289, filed on Dec. 9, 2009, now Pat. No. 9,807,314.

(30) Foreign Application Priority Data

Dec. 10, 2008 (KR) ........................ 10-2008-0125353

(51) Int. Cl.
*H04N 5/262* (2006.01)
*H04N 23/60* (2023.01)
*H04N 23/69* (2023.01)
*H04N 23/63* (2023.01)

(52) U.S. Cl.
CPC ............. *H04N 5/262* (2013.01); *H04N 23/60* (2023.01); *H04N 23/633* (2023.01); *H04N 23/69* (2023.01)

(58) Field of Classification Search
CPC ............. H04N 5/232939; H04N 5/232; H04N 5/23296; H04N 5/262; H04N 23/60; H04N 23/633; H04N 23/69; H04N 23/00
USPC ....................................................... 348/239
See application file for complete search history.

(56) References Cited

U.S. PATENT DOCUMENTS

| 4,989,078 A | 1/1991 | Paxton |
| 5,005,083 A | 4/1991 | Grage et al. |
| 5,754,230 A | 5/1998 | Tsuruta |

(Continued)

FOREIGN PATENT DOCUMENTS

| JP | 2004-180107 A | 6/2004 |
| KR | 10-2005-0109190 A | 11/2005 |

(Continued)

*Primary Examiner* — Usman A Khan
(74) *Attorney, Agent, or Firm* — Jefferson IP Law, LLP

(57) ABSTRACT

A terminal having a camera and a method of processing an image in the camera are disclosed. The method includes collecting, using a camera, a user image captured at a user focal length and a link image captured at a selective focal length, and storing the user image and the link image by linking the link image with the user image. Using this method, a user can capture a subject and circumstances around the subject when the image is captured.

14 Claims, 10 Drawing Sheets

(56) References Cited

U.S. PATENT DOCUMENTS

| | | |
|---|---|---|
| 6,646,677 B2 | 11/2003 | Noro et al. |
| 6,757,008 B1 | 6/2004 | Smith |
| 6,977,676 B1 | 12/2005 | Sato et al. |
| 7,110,040 B1 | 9/2006 | Misawa |
| 2002/0152557 A1 | 10/2002 | Elberbaum |
| 2002/0178278 A1 | 11/2002 | Ducharme |
| 2003/0020814 A1 | 1/2003 | Ono |
| 2003/0160886 A1 | 8/2003 | Misawa et al. |
| 2004/0179131 A1* | 9/2004 | Honda ............ H04N 23/632 348/E5.034 |
| 2005/0100087 A1 | 5/2005 | Hasegawa et al. |
| 2005/0212817 A1* | 9/2005 | Cannon ............ H04N 23/635 345/619 |
| 2005/0253953 A1 | 11/2005 | Ono |
| 2006/0044285 A1* | 3/2006 | Sato .................. G06F 3/04883 345/173 |
| 2006/0187322 A1* | 8/2006 | Janson, Jr. ............ H04N 23/69 348/E5.025 |
| 2006/0259552 A1 | 11/2006 | Mock et al. |
| 2006/0275025 A1 | 12/2006 | Labaziewicz et al. |
| 2007/0025714 A1 | 2/2007 | Shiraki |
| 2007/0120988 A1 | 5/2007 | Akiyama et al. |
| 2007/0279482 A1 | 12/2007 | Oswald et al. |
| 2007/0285550 A1 | 12/2007 | Son |
| 2008/0034306 A1 | 2/2008 | Ording |
| 2008/0297587 A1 | 12/2008 | Kurtz et al. |
| 2010/0141737 A1* | 6/2010 | Li ...................... H04N 23/698 348/E7.001 |

FOREIGN PATENT DOCUMENTS

| | | |
|---|---|---|
| KR | 10-2007-0087316 A | 8/2007 |
| KR | 10-0749337 B1 | 8/2007 |
| KR | 10-2007-0117284 A | 12/2007 |

* cited by examiner

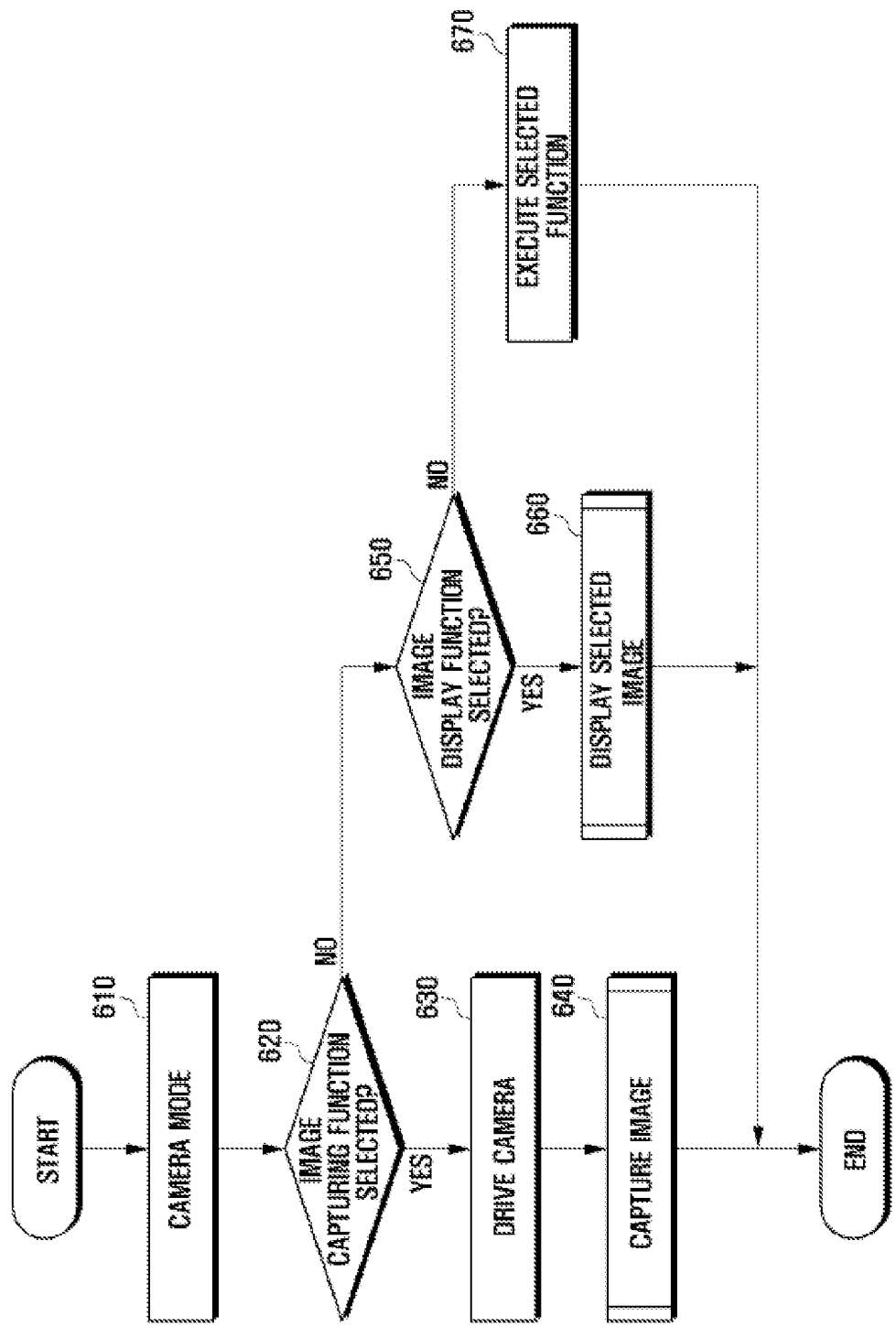

TERMINAL HAVING CAMERA AND METHOD OF PROCESSING IMAGES AT DIFFERENT FOCAL LENGTHS BY SINGLE IMAGE CAPTURE REQUEST

CROSS REFERENCE TO RELATED APPLICATION(S)

This application is a continuation application of prior application Ser. No. 16/259,392, filed on Jan. 28, 2019, which application is a continuation application of prior application Ser. No. 13/908,494, filed on Jun. 3, 2013, which has issued as U.S. Pat. No. 10,225,488 on Mar. 5, 2019, which is a continuation application of prior application Ser. No. 12/634,289, filed on Dec. 9, 2009, which has issued as U.S. Pat. No. 9,807,314 on Oct. 31, 2017 and was based on and claimed priority under 35 U.S.C § 119(a) of a Korean patent application number 10-2008-0125353, filed on Dec. 10, 2008, in the Korean Intellectual Property Office, the disclosure of which is incorporated by reference herein in its entirety.

BACKGROUND OF THE INVENTION

1. Field of the Invention

Exemplary embodiments of the present invention relate to a method of processing an image captured by a camera at different focal distances and a terminal for performing the same.

2. Description of the Background

Recently, with advances in modern science and technology, a user of a portable terminal can create and store data using various terminals and may read and/or view the stored data as necessary. Multi-function terminals, each capable of performing functions that were previously executed by several terminals, are now being developed. Examples of multi-function terminals include, for example, a computer, a mobile terminal, an MP3 player, a portable multimedia player (PMP), and a digital camera.

A digital camera may be used to capture an image. Digital cameras are becoming increasingly smaller permitting them to be carried or to be integrated with other small-sized apparatuses, such as a mobile terminal.

However, display of an image captured by a digital camera may be restricted in size to a display unit, such as a viewfinder, so that the captured image may include only a subject or a scene the user wishes to capture. However, the user may not have information regarding the subject and circumstances (e.g., environment, conditions) at the time the image is captured.

SUMMARY OF THE INVENTION

Exemplary embodiments of the present invention provide a terminal having a camera and an image processing method performed therein.

Additional features of the invention will be set forth in the description which follows, and in part will be apparent from the description, or may be learned by practice of the invention.

Exemplary embodiments of the present invention disclose a method of processing an image. The method includes capturing a first image at a user focal length with a camera, capturing a link image at a selective focal length, linking the link image with the first image; and storing the first image and the link image.

Exemplary embodiments of the present invention also disclose an image processing method of a mobile terminal. The image processing method includes displaying at least one first image in an image display mode, determining, if one of the at least one first image is selected, whether a link image is linked with the selected first image, and displaying the selected first image and a link icon corresponding to the link image if a link image is linked with the selected first image.

Exemplary embodiments of the present invention also disclose a mobile terminal including a camera, a storage unit, a display unit, and a controller. The camera captures a first image at a first focal length and a link image at a second focal length. The storage unit stores the first image and the link image. The display unit displays the first image and the link image. The controller controls the camera to capture the first image and the link image and links the link image with the first image.

Exemplary embodiments of the present invention also disclose a mobile terminal including a storage unit, a display unit, and a controller. The storage unit stores a first image and a link image linked with the first image. The display unit displays the first image and/or the link image. The controller controls the display unit to display the first image and a link icon corresponding to the link image linked with the first image in an image display mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 6 is a flowchart illustrating a method of processing an image according to exemplary embodiments of the present invention.

DETAILED DESCRIPTION OF EXEMPLARY EMBODIMENTS

Figure 1:
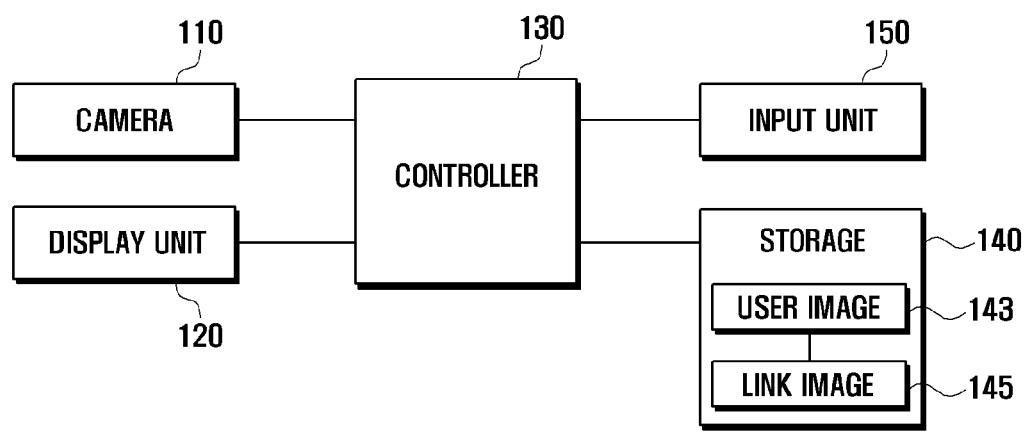
FIG. 1 is a schematic block diagram illustrating a terminal according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Prior to explaining exemplary embodiments of the present invention, relevant terminology will be defined for the description below.

'Terminal' may refer to an information processing device to process various data. Examples of the terminal include, for example, a computer, a lap-top computer, an MP3 player, a mobile terminal, a digital camera, and a portable multimedia player (PMP). The terminal may refer to a mobile terminal and terminals including a digital camera for capturing an image.

'Focal length' may refer to a distance between a lens and a sensor of the camera. The sensor may be an image sensor. 'Reference focal length' may refer to a focal length set to display a preview image on a display unit before an image is captured by a camera. 'User focal length' may refer to a focal length set by a user of the terminal 'Minimal focal length' may refer to a focal length set to a minimal distance between a lens and an image sensor. The minimal distance may be a focal length at maximum zoom-out. 'Maximal focal length' may refer to a focal length set to a maximal distance between the lens and the image sensor. The maximal distance may be a focal length at maximum zoom-in.

'User image' may refer to an image captured by a camera at the user focal length set by the user.

'Link image' may refer to an image linked with the image captured by a camera at the maximal or minimal focal length. The maximal or minimal focal length may be a selective focal length selected according to the user focal length when capturing the user image. The link image may include a subject contained in the user image and information (e.g., circumstances, environment, and conditions) associated with the subject at the capturing of the user image. The link image may have a different resolution than that of the user image.

Hereinafter, exemplary embodiments of the present invention are described in detail with reference to the accompanying drawings.

FIG. 1 is a schematic block diagram illustrating a terminal according to exemplary embodiments of the present invention.

Referring to FIG. 1, a terminal may include a camera 110, a display unit 120, a controller 130, a storage unit 140, and an input unit 150. The storage unit 140 may store a user image 143 and a link image 145.

The camera 110 may capture images with different focal lengths under the control of the controller 130. The camera 110 may capture a user image 143 at a user focal length selected by the user. The camera 110 may capture a link image 145 at a selective focal length set in advance according to the user focal length. The camera 110 is described in further detail below with reference to FIGS. 2A and 2B.

Figure 2A:
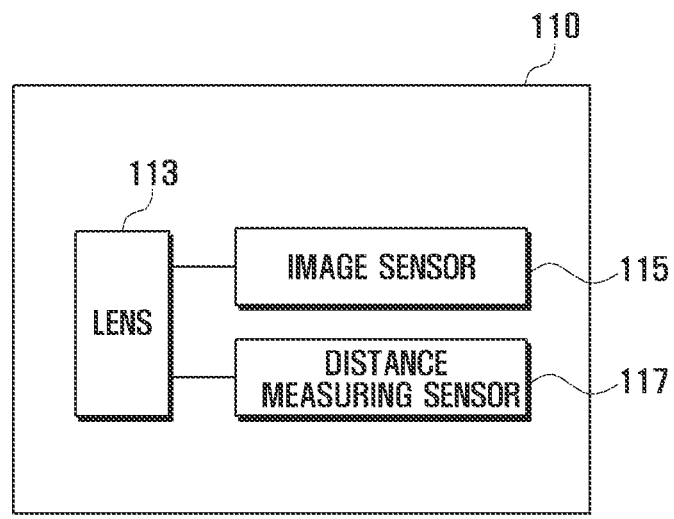
FIGS. 2A and 2B are block diagrams illustrating a camera employed in a terminal according to exemplary embodiments of the present invention.
Figure 2B:
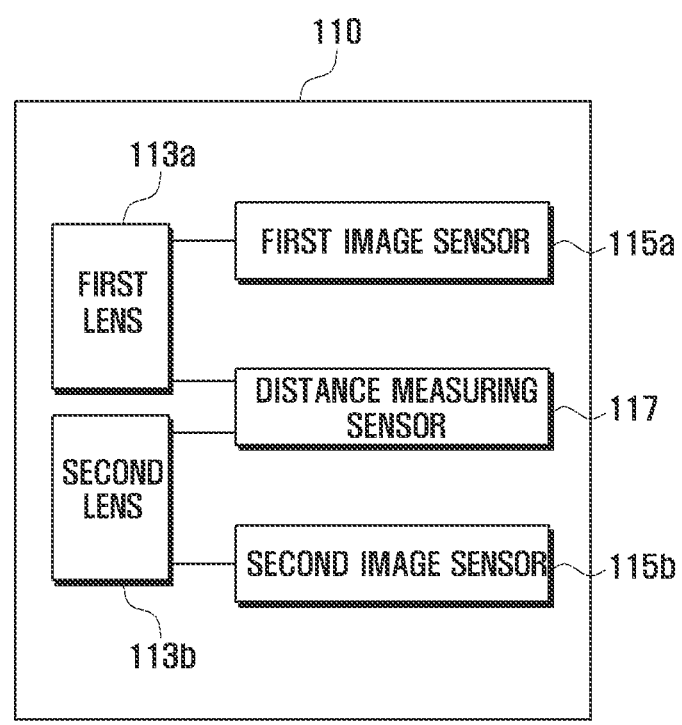

FIGS. 2A and 2B illustrate the camera 110 according to exemplary embodiments of the present invention. Referring to FIG. 2A, the camera 110 may include a lens 113, an image sensor 115, and a distance measuring sensor 117. The lens 113 may be made by grinding surfaces of a transparent material, such as glass, into spherical surfaces. The lens 113 may collect information on a subject. The subject information may include light radiated from the subject. The image sensor 115 may be a charge coupled device (CCD) or a complementary metal oxide semiconductor (CMOS) to convert the subject information collected by the lens 113 into digital image data. The distance measuring sensor 117 may measure a distance between the image sensor 115 and the subject, and may transmit the measured distance to the controller 130. The distance measuring sensor 117 may be an ultrasonic sensor or an infrared sensor.

To capture an image, the distance measuring sensor 117 may measure a distance between the subject and the lens 113 of the camera 110, and may transmit the measured distance to the controller 130. Then, the lens 113 and the image sensor 115 of the camera 110 may be set to the reference focal length corresponding to the measured distance under the control of the controller 130. When the subject information is collected through the lens 113, the image sensor 115 may convert the subject information into digital image data and may transmit the converted digital image data to the controller 130.

The focal length may be set by the user. The lens 113 may collect the subject information according to the set focal length.

The subject information collected through the lens 113 may vary according to the focal length set in the camera 110. A relationship between the focal length and the subject information can be described using zoom-in/out functions of the camera 110. For example, the zoom-in function may be used to display an enlarged view of the subject. To execute the zoom-in function, the focal length of the lens 113 may be set close to a maximal focal length, which is the maximal distance between the lens 113 and the image sensor 115. The zoom-out function may display a smaller view of the image including the subject, and the circumstances and the environment associated with the subject. To execute the zoom-out function, the focal length may be set close to a minimal focal length, which is the minimal distance between the lens 113 and the image sensor 115. As the focal length is decreased, information collected by the camera 110 may include information on the subject, and the circumstances and the environment associated with the subject. As the focal length is increased, the camera 110 may only collect information on the subject.

In some cases, the camera 110, as illustrated in FIG. 2B, may include a first lens 113a, a second lens 113b, a first image sensor 115a and a second image sensor 115b connected to the first lens 113a and second lens 113b, respectively, and a distance measuring sensor 117. The image sensors 115a and 115b and the distance measuring sensor 117 may perform the same function as that of the image sensor 115 and the distance measuring sensor 117 discussed with reference to FIG. 2A. The first and second lenses 113a and 113b may perform the same function as that of the lens 113 discussed with reference to FIG. 2A.

A focal length of the first lens 113a may be set to any suitable focal length by the controller 130. The second lens 113b may be a wide-angle lens and its focal length may be fixed to the minimal focal length.

A method of capturing an image with the camera 110 including the first and second lenses 113a and 113b is described further below. The distance measuring sensor 117 may measure a distance between a subject and the first lens 113a of the camera 110, and may transmit the measured distance to the controller 130. Then, a focal length between the first lens 113a and the first image sensor 115a may be set by the controller 130 as a reference focal length based on the measured distance. When subject information is collected through the first lens 113a, the first image sensor 115a may convert the collected subject information into digital image data. The first image sensor 115a may transmit the converted digital image data to the controller 130. The subject information may be collected simultaneously when the image is captured by the first lens 113a. The second lens 113b may be a wide-angle lens. Information collected through the second lens 113b may include information, such as the environment, circumstances, and conditions associated with the subject at the time of the image capture of the subject.

The second lens 113b of the camera 110 may be set to the minimal focal length by the controller 130 and may collect the subject information according to the set minimal focal length. The subject information collected through the second lens 113b may be changed according to the focal length set in the camera 110.

Hereinafter, a camera 110 including a single lens 113 will be described (e.g., as shown in FIG. 2A).

The display unit 120 may display an overall state of the terminal, and information related to operations of the terminal. The display unit 120 may display a user image 143 captured by the camera 110. In an image display mode, the display unit 120, under the control of the controller 130, may display at least one user image 143 in the form of, for example, a thumbnail. The display unit 120 may display a link icon 147 corresponding to a link image 145 linked with the user image 143 in the thumbnail. The user image 143 may be displayed over the link image 145.

Figure 3A:
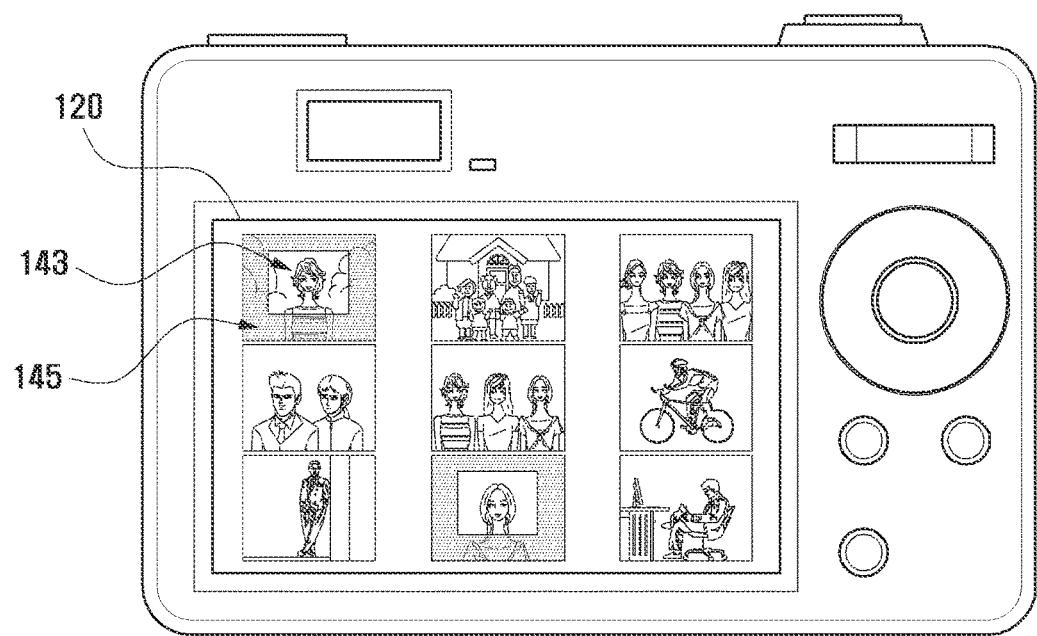
FIG. 3A and FIG. 3B are exemplary views illustrating a screen displaying an image according to exemplary embodiments of the present invention.
Figure 3B:
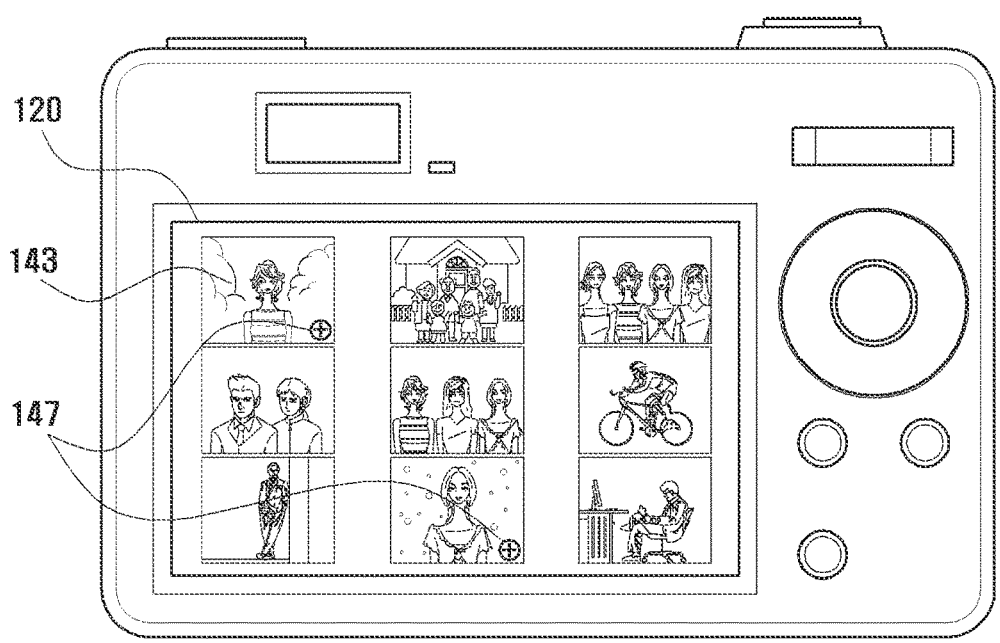

A method of displaying a user image 143 in the display unit 120 will be described with reference to FIG. 3A and FIG. 3B. FIG. 3A and FIG. 3B are exemplary views illustrating screens on which images are displayed according to exemplary embodiments of the present invention.

Referring to FIG. 3A, in the image display mode, the display unit 120 may display the user image 143 in the form of a thumbnail. When a link image 145 is linked with the user image 143, the display unit 120 may display a thumbnail corresponding to the user image 143 to overlap a thumbnail corresponding to the link image 145.

Referring to FIG. 3B, when the link image 145 and the user image 143 are captured, the display unit 120 may display a link icon 147 on the thumbnail corresponding to the user image 143. Although the user image 143 is displayed in the thumbnail on the display unit 120, the user image 143 may be displayed as a list displaying at least one thumbnail with file name corresponding to the user name. Even if the user image 143 is displayed as a list, the display unit 120 may display the link image 145 as a link icon 147 to overlap a thumbnail corresponding to the link image 145.

When the user image 143 displayed in the form of a thumbnail or a list is selected, the display unit 120 may enlarge and display the selected user image 143 under the control of the controller 130. The display unit 120 may display the selected user image 143 and the link icon 147 for selection of the link image 145 linked with the user image 143. The display unit 120 may display the link image 145 under the control of the controller 130. The display unit 120 may only display the link image 145 or, in some cases, may display the user image 13 on the link image 145.

A method of displaying the link image 145 will be described with reference to FIG. 4.

The controller 130 may control the overall state and operations of components of the terminal. When capturing an image, the controller 130 may estimate a reference focal length based on a distance between the camera 110 and a subject of the image. The distance may be measured by the camera 110. The controller 130 may set the camera 110 based on the estimated reference focal length and may display, on the display unit 120, a preview image acquired by the camera 110.

Next, the controller 130 may capture the user image 143 with the camera 110 according to the user focal length. The controller 130 may determine whether the reference focal length estimated to display the preview image is shorter than the user focal length selected by the user. If the reference focal length is shorter than the user focal length, the controller 130 may set the camera 110 to the minimal focal length. The controller 130 may then control the camera 110 to capture the link image 145 according to the minimal focal length. The controller 130 may link the link image 145 with the user image 143 and may store the user image 143 in the storage unit 140.

When the display mode is selected, the controller 130 may instruct the display unit 120 to display the user image 143 stored in the storage unit 140 in the form of a thumbnail. The display unit 120 may display the link icon 147 and the link image 145 on the user image 143. In some cases, the controller 130 may display the user image 143 overlapping the link image 145 on the display unit 120.

When the user image 143 displayed in the form of a thumbnail is selected, the controller 130 may enlarge the selected user image 143 and may instruct the display unit 120 to display the selected user image 143. When a link image 145 is linked with the user image 143 displayed on the display unit 120, the controller 130 may display a link icon 147 enabling selection of the link image 145 on the display unit 120. When the link icon 147 is selected, the controller 130 may display the link image 145 linked with the user image 143 on the display unit 120. The display unit 120 may only display the link image 145 according to the user choice. In some cases, the controller 130 may reduce the user image 143 by a preset ratio and may instruct the display unit 120 to display the reduced user image 143 on the link image 145. The controller 130 may align a center of the user image 143 with that of the link image 145. The centers of the user image 143 and the link image 145 may be regions of the images upon which the camera 110 was focused while capturing the link image 143 and the user image 145.

Hereinafter, a method of displaying the user image 143 and the link image 145 will be described with reference to FIG. 4 and FIGS. 5A and 5B.

Figure 4:
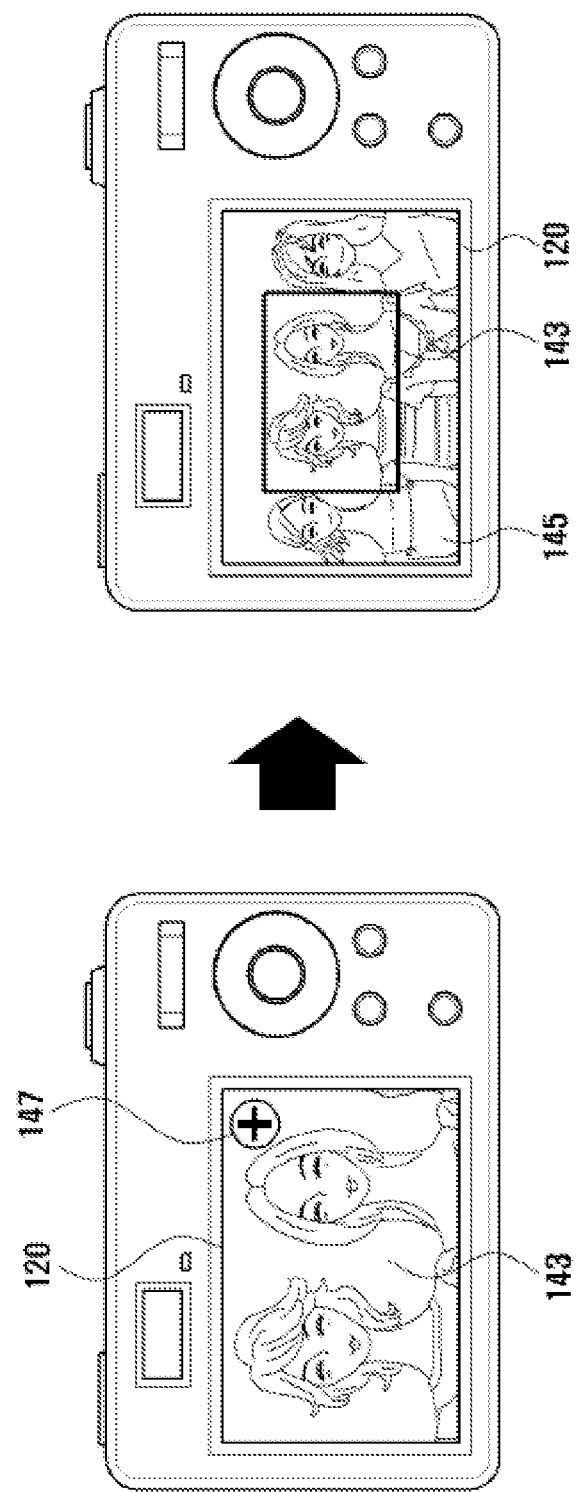
FIG. 4 is an exemplary view illustrating a screen displaying an image according to exemplary embodiments of the present invention.

FIG. 4 is an exemplary view illustrating a screen to display an image according to exemplary embodiments of the present invention.

Referring to FIG. 4, the controller 130 may display the user image 143, selected by the user, on the display unit 120, as illustrated in FIG. 4. When the link image 145 is linked with the user image 143, the controller 130 may display the link icon 147 with the user image 143. The link image 147 may be displayed on the upper right side of the user image 143, but exemplary embodiments of the present invention are not limited thereto. For example, the link icon 147 may be displayed on any part of or along the user image 143 and various types of the link icon 147 may be employed.

If the link icon 147 is selected, the controller 130 may display the link image 145 linked with the user image 143 on the display unit 120, as illustrated in FIG. 4. If the link image 145 is then captured, the controller 130 may reduce a size of the displayed link image 145 according to a comparison between the user focal length and the reference focal length or may reduce the size of the user image 143.

For example, when the link image 145 is captured at the minimal focal length and stored in the storage unit 140, the controller 130 may reduce a size of the user image 143 by a preset ratio. The display unit 120 may display the reduced user image 143 on the link image 145. The display unit 120 may display the link image 145 in a manner distinguished from the user image 143. For example, the link image 145 may be displayed as more opaque than the user image 143. The controller 130 may align the center of the user image 143 with the center of the link image 145 when the display unit 120 displays the user image 143 and the link image 145. In general, the reduced user image 143 may be displayed at any suitable region of the link image 145.

Hereinafter, a method of reducing the user image 143 or the link image 145 by a preset ratio will be described with reference to FIGS. 5A and 5B. FIGS. 5A and 5B are views illustrating the user image 143 and the link image 145 at the focal length according to exemplary embodiments of the present invention.

Figure 5A:
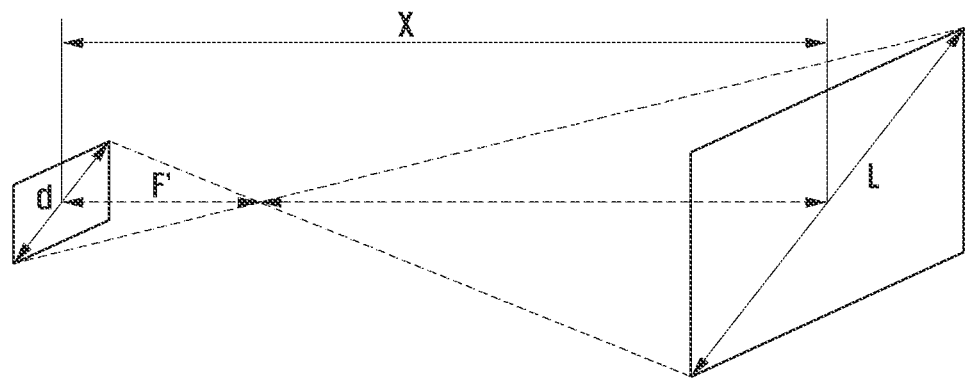
FIGS. 5A and 5B are views illustrating a ratio between a user image and a link image according to exemplary embodiments of the present invention.

In FIG. 5A, a link image 145 of a subject is captured at the minimal focal length. In FIG. 5B, a user image 143 of a subject is captured at the user focal length.

Figure 5B:
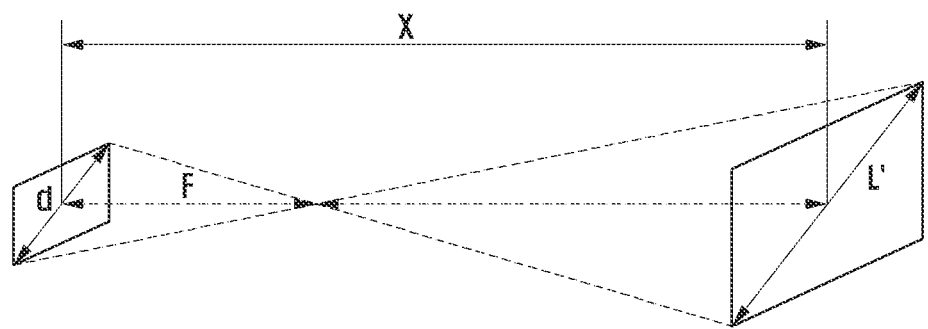

In FIG. 5A and FIG. 5B, reference numeral d may refer to a size of the image sensor 115; X may be a distance between the image sensor 115 and the subject; F' may be a minimal focal length between the image sensor 115 and the lens 113; and F may be a user focal length between the image sensor 115 and the lens 113. The user focal length F may be selected by the user. If two lenses 113 are used, the image sensors 115 may have different d sizes.

L may refer to a range of a subject included in the link image 145 based on the minimal focal length F'. L' may refer to a range of a subject included in the user image 143 based on the user focal length F. Hereinafter, an example in which the user image 143 and the link image 145 have the same resolution and the user focal length F is longer than the minimal focal length F' is described.

L' as a range of a subject captured at the user focal length F may be less than L as a range of a subject to be captured at the minimal focal length F'. Thus, the controller 130 can match the range of the user image 143 with the range of the link image 145 by reducing a size of the user image 143. To reduce the size of the user image 143, the controller 130 may estimate a proportional value between the range L' of a subject of the user image 143 and the range L of a subject of the link image 145. The controller 130 may calculate the range L' of a subject of the user image 143 and the range L of a subject of the link image 145 using Equation 1 and Equation 2.

$$L' = \frac{d(X-F)}{F} \quad \text{[Equation 1]}$$

$$L = \frac{d(X-F')}{F'} \quad \text{[Equation 2]}$$

In Equation 1 and Equation 2, d is a size of the image sensor 115, X is a distance between the image sensor 115 and a subject, F' is a minimal focal length between the image sensor 115 and the lens 113, and F is a user focal length between the image sensor 115 and the lens 113.

The controller 130 may calculate ranges L' and L of the subject at the respective focal lengths from Equation 1 and Equation 2. The controller 130 may then reduce the size of the user image 143 by a proportional value obtained by dividing L' by L.

If the user image 143 and the link image 145 have different resolutions, the controller 130 may obtain a value by dividing the resolution of the user image 143 by the resolution of the link image 145. The controller 130 may multiply the obtained value by a value that is obtained by dividing the range L' of the subject of the user image 143 by the range L of the subject of the link image 145. The controller 130 may reduce the user image 143 using the calculated proportional value.

If the user focal length F is shorter than the minimal focal length F', the controller 130 may calculate ranges L' and L of a subject with respect to respective focal lengths from Equation 1 and Equation 2. The controller 130 may reduce the link image 145 by a proportional value obtained by dividing L' by L.

Referring back to FIG. 1, the storage unit 140 may store data generated during the execution of application programs and functions which are related to functions executed in the terminal. The storage unit 140 may store a user image 143 and a link image 145 captured by an image photographing function under the control of the controller 130. The storage unit 140 may store a link icon 147 to select the link image 145 linked with the user image 143 in the image display mode.

The input unit 150 may transmit settings of various functions input by the user and input signals related to functional control to the controller 130. The input unit 150 may include a function key to select a focal length of the camera 110 and a function key to select an image photographing function in a camera mode. The input unit 150 may include a function key to select the link icon 147 displayed on the user image 143 in the image display mode.

A method of capturing an image and displaying the captured image in the terminal will be described with reference to FIG. 6, FIG. 7, and FIG. 8. FIG. 6 shows a flowchart of a method of processing an image according to exemplary embodiments of the present invention.

Referring to FIG. 6, when a user selects a camera mode using a menu or a function key, the controller 130 may change a mode of a mobile terminal to a camera mode and may execute functions related to the camera 110 (610). The controller 130 may then display functions to be executed in the camera mode on the display unit 120. The functions to be executed in the camera mode may be an image capturing function, an image display function, and/or an image editing function. In general, any number and type of suitable functions may be displayed on the display unit 120 in the camera mode.

The controller 130 may determine whether the image capturing function is selected (620). When the user selects the image capturing function to capture a subject, the controller 130 may drive the camera 110 (630). The controller 130 may capture an image according to the user's selection (640). Step 640 will be described in further detail with reference to FIG. 7.

If the image capturing function is not selected (620), the controller 130 may determine whether the image display function is selected (650). If the user selects the image display function, the controller 130 may display an image selected by the user on the display unit 120 (660). Step 660 will be described in further detail with reference to FIG. 8.

However, if the image display function is not selected (650), the controller 130 may execute the function selected by the user (670). The executable functions may be an image processing function, such as, for example, an image editing function, or functions for reproducing and generating other types of data used in, for example, a PMP and/or an MP3 player.

Image capturing in step 640 will be described with reference to FIG. 7. FIG. 7 shows a flowchart illustrating image capturing according to exemplary embodiments of the present invention.

Figure 7:
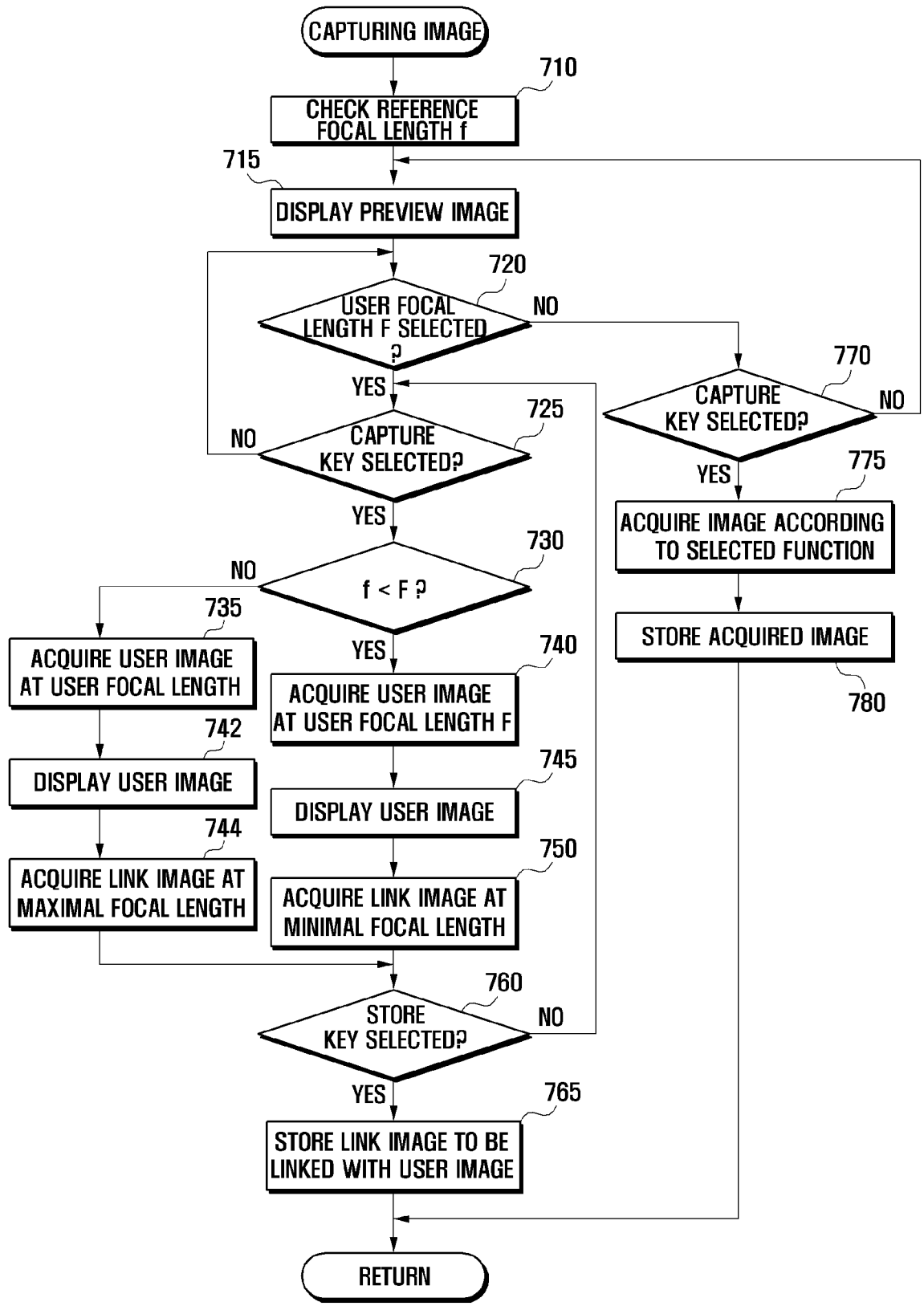
FIG. 7 is a flowchart illustrating a method of capturing an image according to exemplary embodiments of the present invention.

Referring to FIG. 7, when the camera 110 is driven, the controller 130 may check the reference focal length f (710). The controller 130 may set the camera 110 according to the reference focal length f and may display a preview image acquired at the set reference focal length f on the display unit 120 (715). The reference focal length f may be set to a distance between a subject and the camera 110 and may be automatically checked when the camera 110 is powered on. In some cases, the reference focal length f may be a distance between the lens 113 and the image sensor 115 and may be set as a reference value.

Next, the controller 130 may determine whether the user focal length F is selected (720). Determining whether the user focal length F is selected may include determining whether a zoom-in function or a zoom-out function is selected through a menu or the function keys.

If the user focal length F is selected, the controller 130 may set the focal length of the camera 110 to the selected user focal length F. The controller 130 may then determine whether the capture key is selected (725). If the capture key is not selected, the controller may return to step 729. If the user selects the capture key through the function keys or a menu, the controller 130 may determine whether the selected user focal length F is longer than the reference focal length f (730). If the user focal length F is shorter than the reference focal length f, the controller 130 may control the camera 110 to acquire the user image 143 at the user focal length F (735). The controller 130 may display the captured user image 143 on the display unit 120 (742). Next, the controller 130 may set the focal length of the camera 110 to the maximal focal length and may acquire a link image 145 at the maximal focal length (744). After acquiring the link image, the controller may proceed to step 760, as described further below.

If the user focal length F is longer than the reference focal length f, the controller 130 may control the camera 110 to acquire the user image at the user focal length F (740). Then, the controller 130 may display the captured user image 143 on the display unit 120 (745). Next, the controller 130 may set the focal length of the camera 110 to the minimal focal length and may acquire a link image 145 at the minimal focal length (750).

When the link image 145 is acquired, the controller 145 may determine whether the store key is selected (760). If the store key is not selected, the controller 130 may return to step 725 and perform the above-mentioned procedures again to acquire the user image 143 and the link image 145. If the store key is selected through a menu or by pressing a function key, the controller 130 may store the user image 143 and the link image 145 linked to the user 143 in the storage unit 140 (765).

When the user focal length F is not selected (720), the controller 130 may determine whether a capture key is selected (770). If the capture key is selected, the controller 130 may control the camera 110 to acquire an image through the selected function (775). The selectable function may include supplementary functions selected when capturing an image, such as, for example, an automatic-shutter function, an image quality selecting function, and a white balance selecting function. The controller 130 may then store the acquired image in the storage unit 140 (780).

Hereinabove, the method of capturing the user image 143 and the link image with a camera 110 having a single lens has been described. A method of capturing the user image 143 and the link image 145 with a camera having two lenses may be similar to the method of capturing the user image 143 and the link image 145 with the camera 110 having a single lens, except that, if the camera has two lenses, the link image 145 and the user image 143 may be captured simultaneously. For example, with the camera having two lenses, the user image 143 may be acquired at the user focal length F using a first lens 113a and the link image 145 may be acquired at the minimal focal length F' through a second lens 113b. Thus, the controller 130 may control the camera 110 to acquire the user image 143 and the link image 145 through the first and second lenses 113a and 113b simultaneously. The display unit 120 may then display the user image 143.

Next, step 660 of capturing an image will be described with reference to FIG. 8. FIG. 8 shows a flowchart illustrating a method of displaying an image according to exemplary embodiments of the present invention.

Figure 8:
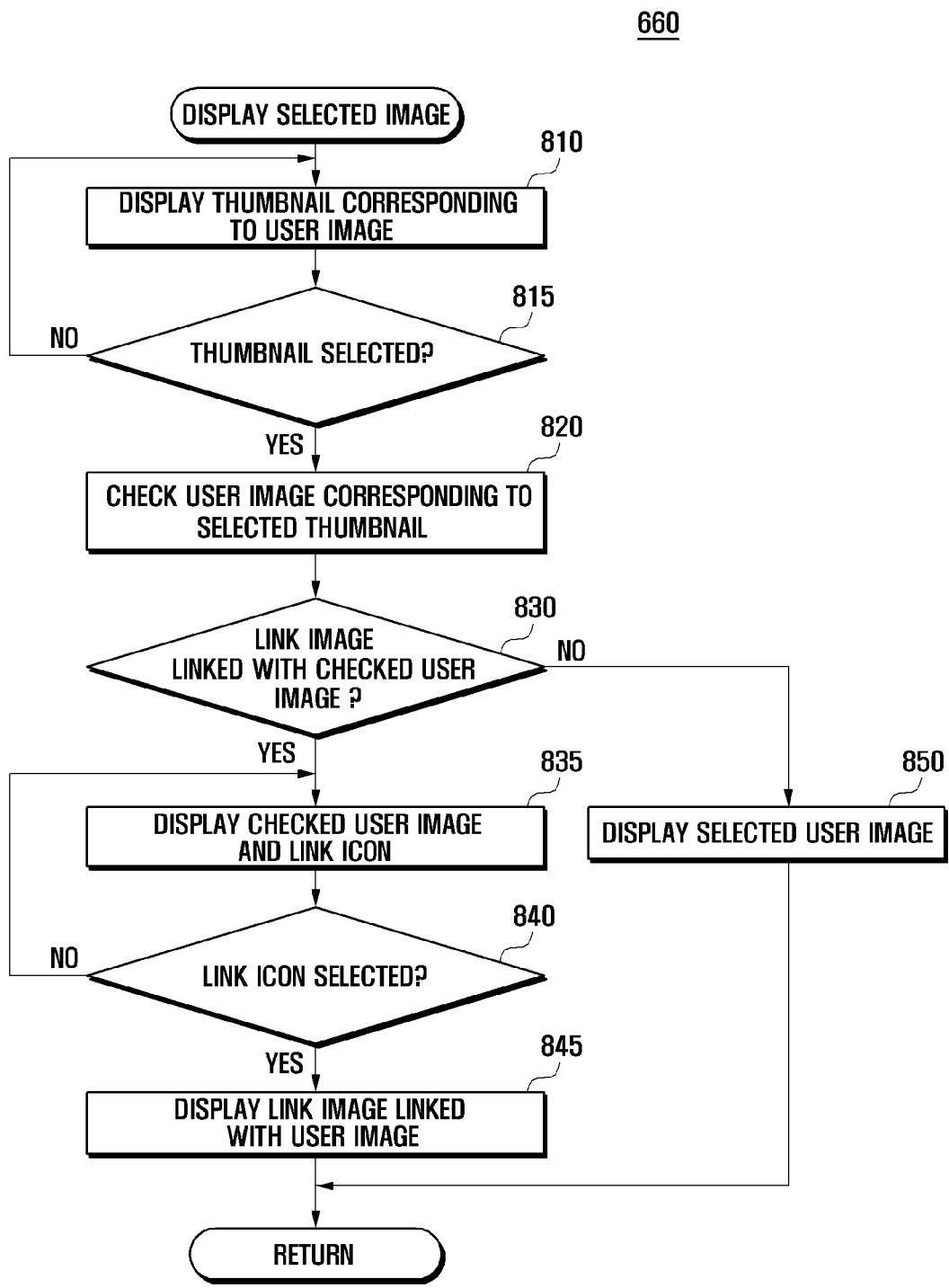
FIG. 8 is a flowchart illustrating a method of displaying an image according to exemplary embodiments of the present invention.

Referring to FIG. 8, when the image display mode is selected, the controller 130 may display at least one user image 143, stored in the storage unit 140, on the display unit 120 in the form of a thumbnail (810). The user image 143 with which the link image 145 is linked may be displayed together with the link icon 147. The user image 143 may be distinguished from another user image according to the user settings or the type of terminal. The user image 143 may be displayed on the link image 145, and/or may be overlapping at least a portion of the link image 145. The user image 143 may be displayed in the form of a thumbnail, or, in some cases, according to user selection, may be displayed as a list.

Next, the controller 130 may determine whether a thumbnail is selected (815). If the user selects the thumbnail corresponding to the user image 143 through a function key provided in the input unit 150, the controller 130 may check the user image 143 corresponding to the selected thumbnail (820). The controller 130 may determine whether a link image 145 is linked with the user image 143 by searching the storage unit 140 (830). If a link image 145 is determined to be stored in the storage unit 140, the display unit 120 may display the checked user image 143 and the link icon 147 (835).

The controller 130 may determine whether the link icon 147 is selected (840). If the link icon 147 is selected, the controller 130 may display the link image 145 linked with the user image 143 on the display unit 120 (845). In some cases, only the link image 145 may be displayed on the display unit 120 or a size of the user image 143 or the link image 145 may be reduced and then displayed. The reduced user image 143 or the reduced link image 145 may overlap, at least partially, on the display unit 120. If the link icon 147 is not selected, the user image 143 and the link image 145 may continue to be displayed.

If no link image 145 is linked with the user image 143 (830), the controller 130 may display the selected user image 143 on the display unit 120 (850).

Hereinabove, the method of capturing two images at difference focal lengths and checking two images has been described. When the user focal length set by a user is longer than the reference focal length, the controller 130 may control the camera 110 to capture the link image 145 at the minimal focal length. However, when the focal length selected by a user is shorter than the reference focal length, the controller 130 may control the camera 110 to capture the link image 145 at the maximal focal length. In this case, the controller 130, in the image display mode, may reduce a size of the link image 145 to be displayed with the user image 143.

Next, another method of simultaneously capturing a link image 145 and the user image 143, as in step 640 of FIG. 6, will be described with reference to FIG. 9.

Figure 9:
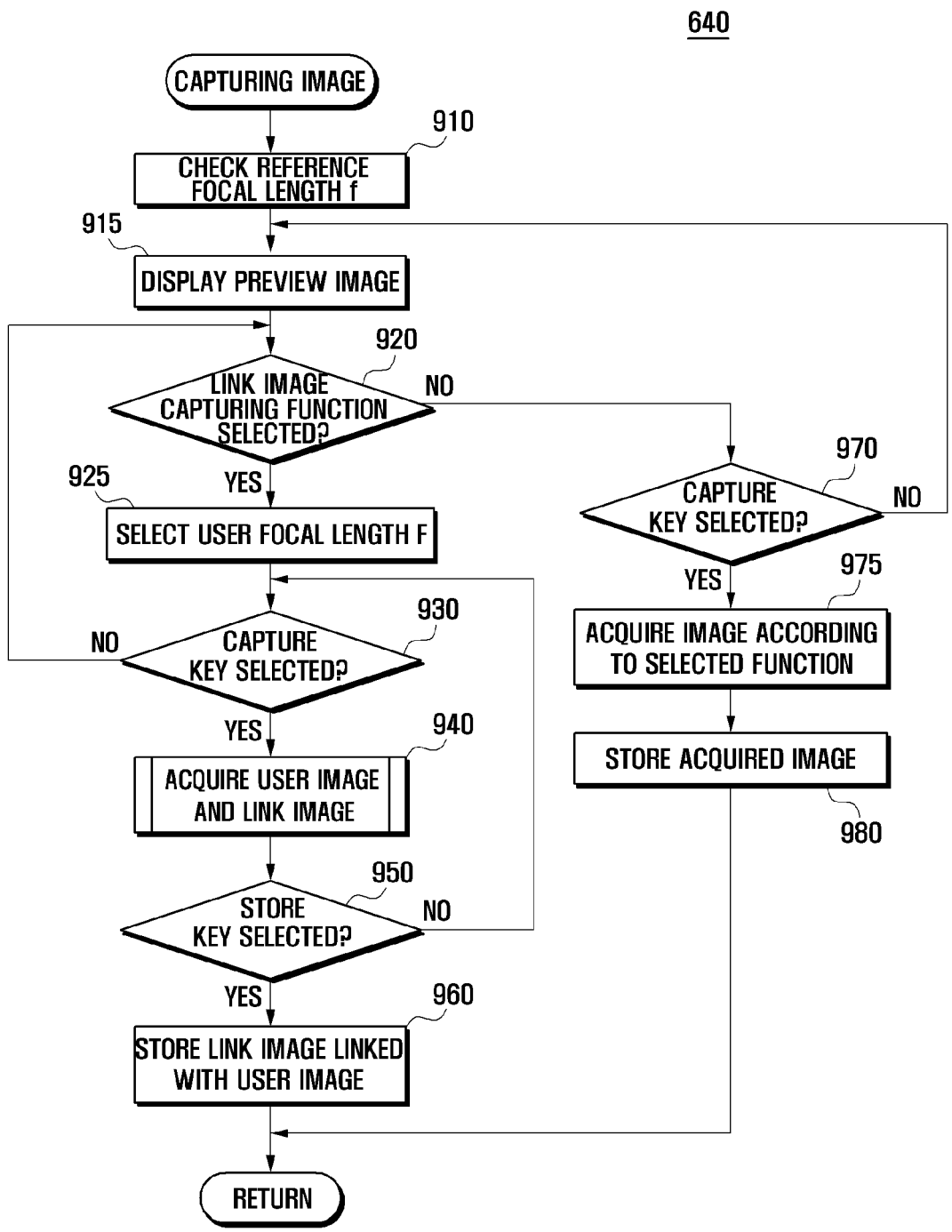
FIG. 9 is a flowchart illustrating an image capturing method according to exemplary embodiments of the present invention.

FIG. 9 shows a flowchart illustrating a method of capturing an image according to exemplary embodiments of the present invention.

Referring to FIG. 9, when the camera 110 is driven, the controller 130 may check the reference focal length f (910). Then, the controller 130 may set the camera 110 to the checked focal length f and may instruct the display unit 120 to display a preview image acquired at the set reference focal length f (915).

The controller 130 may determine whether a link image capturing function is selected through a menu or a function key (920). If the link image capturing function is selected, the controller 130 may determine whether the user focal length F is selected (925). The user focal length F may be set to the checked reference focal length f, or may be changed by the zoom-in function or the zoom-out function. Although not illustrated in the drawings, when the user focal length F is selected, the minimal focal length or the maximal focal length may be selected by a user for the capturing of the link image 145. For example, when the link image capturing function is selected, the controller 130 may display a focal length selecting window to select the user focal length F, the minimal focal length, and the maximal focal length on the display unit 120. The controller 130 may display selection bars for zooming-in/zooming-out in the focal length selecting window according to respective focal lengths.

After selection of the user focal length F, the controller 130 may determine whether a capture key is selected through a capture key input (930). If the capture key is selected, the controller 130 may acquire the user image and the link image through the camera 110 (940). Step 940 will be described in detail with reference to FIG. 10.

Figure 10:
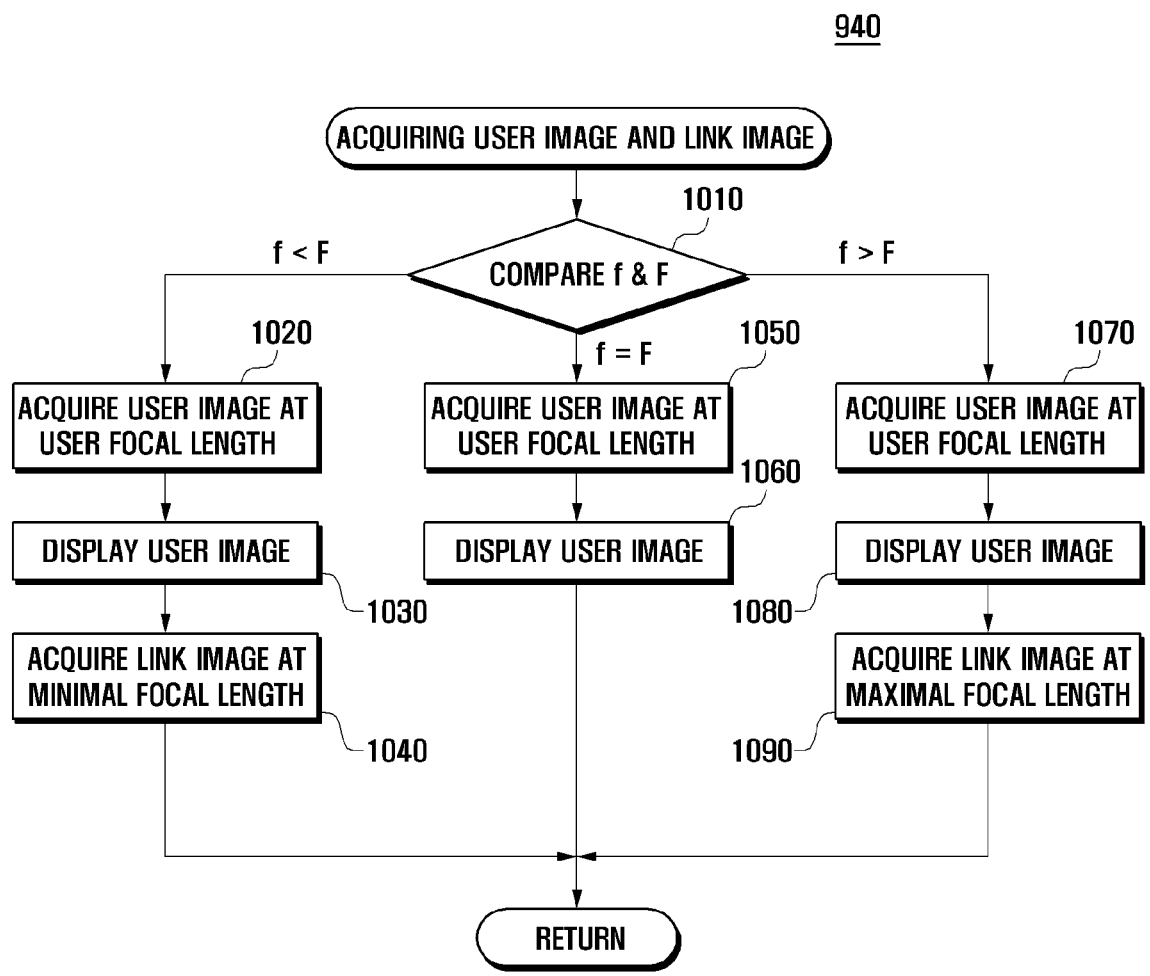
FIG. 10 is a flowchart illustrating a method of capturing an image in accordance with a focal length according to exemplary embodiments of the present invention.

FIG. 10 shows a flowchart illustrating a method of capturing an image based on a focal length according to exemplary embodiments of the present invention.

Referring to FIG. 10, when a capture key is selected, the controller 130 may compare a reference focal length f with a user focal length F to acquire the user image 143 and the link image 145 (1010). The link image 145 may be an image captured at a selective focal length selected by the comparison of the user focal length with the reference focal length. For example, if the reference focal length f is shorter than the user focal length F, the controller 130 may acquire the user image 143 at the user focal length F (1020). The controller may display the acquired user image 143 on the display unit 120 (1030). The controller 130 may set a focal length of the camera 110 to a minimal focal length and capture the link image 145 at the minimal focal length (1040). Then, the controller 130 returns to step 950 shown in FIG. 9.

If the reference focal length f is equal to the user focal length F, the controller 130 may acquire the user image 143 at the user focal length (1050). The controller 130 may display the acquired user image 143 on the display unit 120 (1060) and return to step 950 shown in FIG. 9.

If the reference focal length f is longer than the user focal length F, the controller 130 may acquire the user image 143 at the user focal length F (1070). The controller 130 may display the acquired user image 143 on the display unit 120 (1080). The controller 130 may set the focal length of the camera 110 to the maximal focal length to capture the link image 145 at the set maximal focal length (1090). Then, the controller 130 may return to step 950 shown in FIG. 9.

In step 950 shown in FIG. 9, the controller 130 may determine whether a store key is selected by selecting a menu or inputting a confirm key (950). When the store key is selected, the controller 130 may link the link image 145 with the user image 143 to store the images (960) in the storage unit 140.

If the link image capturing function is not selected (920), the controller 130 may determine whether the capture key is selected by selecting a menu or inputting a function key (970). If the capture key is selected, the controller 130 may acquire an image through a function selected through the camera 110 (975). The selected function that is additionally executed by the camera 110 may include supplementary functions selected at the image photographing such as, for example, an automatic-shutter function, an image quality selecting function, and a white balance selecting function. The controller 130 may store the acquired image in the storage unit 140 (980).

According to the exemplary embodiments described above, a subject that a user desires to photograph, and circumstances (e.g., environment, conditions) around the subject may be captured with a terminal including a camera. The terminal may link captured image with each other. The user may check the captured image using an image linked with the captured image. By doing so, the user may remember the situation surrounding the image at the time of capture.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A mobile device, comprising:
a display;
a first camera having a first lens and a first image sensor;
a second camera having a second lens and a second image sensor; and
a processor configured to at least:
control the display to display a first image obtained by the first camera together with an icon, wherein the icon is for executing a function to obtain images by the first camera and the second camera,
based on a user selection of the icon displayed on the display, control the second camera to obtain a second image while displaying a third image being obtained by the first camera on the display of the mobile device, wherein a size of the third image is different from a size of the first image, and
control the display to display the second image and the third image.

2. The mobile device of claim 1, wherein a focal length of the first camera is different from a focal length of the second camera.

3. The mobile device of claim 1, wherein the processor is further configured to control the display to display the second image by overlapping the third image.

4. The mobile device of claim 3, wherein the size of the third image is smaller than the size of the first image.

5. The mobile device of claim 3, wherein a size of the second image is smaller than the size of the third image.

6. The mobile device of claim 1, wherein the first image comprises a preview image.

7. The mobile device of claim 1, wherein at least one of the first camera and the second camera is configured to support zoom in/out functions.

8. The mobile device of claim 1, wherein the icon is displayed to be positioned on the first image.

9. A method of operating a mobile device including a first camera having a first lens and a first image sensor, and a second camera having a second lens and a second image sensor, the method comprising:
　controlling a display to display a first image obtained by the first camera together with an icon, wherein the icon is for executing a function to obtain images by the first camera and the second camera;
　based on a user selection of the icon displayed on the display, controlling the second camera to obtain a second image while displaying a third image being obtained by the first camera on the display of the mobile device, wherein a size of the third image is different from a size of the first image; and
　controlling the display to display the second image and the third image.

10. The method of claim 9, wherein the controlling of the display to display the second image and the third image comprises controlling the display to display one of the second image by overlapping the third image.

11. The method of claim 9, wherein the size of the third image is smaller than the size of the first image.

12. The method of claim 11, wherein a size of the second image is smaller than the size of the third image.

13. The method of claim 9, wherein the first image comprises a preview image.

14. The method of claim 9, wherein the icon is displayed to be positioned on the first image.

* * * * *